ന്ന
2,751,402

OXIDATION OF HYDROCORTISONE ESTERS TO CORTISONE ESTERS

William P. Schneider, Kalamazoo, Mich., assignor to The Upjohn Company, Kalamazoo, Mich., a corporation of Michigan No Drawing. Application August 13, 1953, Serial No. 374,105

7 Claims. (Cl. 260—397.45)

This invention relates to a novel process for the oxidation of certain steroids, more particularly to the oxidation of esters of hydrocortisone with certain N-haloamides and N-haloimides in the presence of an amine, to produce an ester of cortisone.

It is an object of the present invention to provide a novel process for the oxidation of esters of hydrocortisone to produce in high yield the corresponding esters of cortisone. Another object is the provision of a particular process for the production of cortisone acetate. Other objects will be apparent to those skilled in the art to which this invention pertains.

The starting steroids of the present invention are acyloxy esters of hydrocortisone, i. e. 11β,17α-dihydroxy-21-acyloxy-4-pregnene-3,20-diones. The process of the present invention may be represented in the following manner:

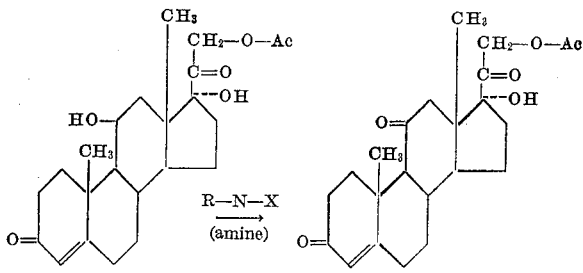

wherein Ac represents the acyl radical of an organic carboxylic acid, preferably a lower-aliphatic carboxylic acid containing from one to eight carbon atoms, inclusive, and wherein R-N-X represents a compound selected from the group consisting of N-chloro-amides, N-chloro-imides, N-bromo-amides and N-bromo-imides.

According to the present invention, 11β,17α-dihydroxy-21-acyloxy-4-pregnene-3,20-dione is oxidized with a compound selected from the group consisting of N-chloro-amides, N-chloro-imides, N-bromo-amides and N-bromo-imides, in a substantially non-reactive organic solvent containing an amine, preferably at least about a molar equivalent of an amine, calculated on the starting steroid, to produce 17α-hydroxy-21-acyloxy-4-pregnene-3,11,20-trione. Surprisingly, the oxidation is a selective one with the oxidizing agents of the present invention readily oxidizing the eleven hydroxy group without affecting other portions of the steroidal molecule. Although the side chain and the Δ⁴-3-keto group are known to be susceptible to oxidation and halogenation, when following the process of the present invention, an ester of cortisone can be produced from an ester of hydrocortisone in practically quantitative yield.

11β,17α - dihydroxy - 21 - acyloxy - 4 - pregnene - 3,20-diones which may be employed as starting steriods include those esters of hydrocortisone wherein the 21-acyloxy group is aliphatic, aromatic, aralkyl, alkaryl, heterocyclic, polybasic, unsaturated, or halogen containing, e. g., lower-aliphatic such as, formyloxy, acetoxy, propionyloxy, butyryloxy, valeryloxy, hexanoyloxy, heptanoyloxy, octanoyloxy, preferably acetoxy, trimethylacetoxy, dimethylacetoxy, cyclopentanepropionyloxy, benzoxy, phenylacetoxy, 2,6-dimethylbenzoxy, succinoyloxy, phthaloyloxy, cylcopentylformyloxy, cyclohexylformyloxy, pyridyl-2-formyloxy, and others. Since the particular ester group present on the starting steroid does not appreciably affect the course of the reaction, the selection of the particular starting ester of hydrocortisone is not critical. Hydrocortisone acetate is preferred, however, as the starting steroid since this ester is somewhat more readily available and is converted in outstandingly high yield to cortisone acetate, a highly useful physiologically active steriod.

Oxidizing agents which are used in the process of the present invention are selected from the group consisting of N-chloro-amides, N-chloro-imides, N-bromo-amides and N-bromo-imides. Of especial interest are N-chloro-acetamide, N-bromo-acetamide, N-chloro-succinimide and N-bromo-succinimide, of which N-bromo-acetamide is preferred for its practically quantitative production of cortisone acetate and its economy.

The reaction is conducted in an organic solvent in which both the N-halo oxidizing agent and the starting steroid are usually completely dissolved, although this is not necessarily required to achieve a satisfactory oxidation. Since any reaction of the oxidizing agent or steroid with the reaction solvent would complicate the reaction, the reaction should be performed in a substantially non-reactive solvent such as, for example, methyl ethyl ketone, dioxane, tertiary butanol, benzene, hydrocarbon solvents, chloroform, carbon tetrachloride, methylene chloride, diethyl ether, ethyl acetate, acetone, mixtures of these or others.

The reaction is normally conducted at a temperature between about zero and about fifty degrees centigrade, usually room temperature. Temperatures normally employed in an oxidation of this type but which are beyond these limits may also be employed but there is usually obtained a less than optimum yield of desired product.

The inclusion of an amine in the reaction mixture prevents any concomitant halogenation of the starting steroid or reaction product without otherwise interfering with the course of the reaction. Aliphatic, aromatic, aralkyl, alkaryl, heterocyclic, and other types of amines of sufficient basicity to combine with hydrogen halide may be used, but the heterocyclic aromatic tertiary amines, e. g., pyridine, quinoline, lutidines, collidines, picoline, etc., are preferred. Since a mole of hydrogen halide is theoretically produced per mole of steroid which is oxidized, at least about a molar equivalent, calculated on the starting steroid, of amine is preferably used in the reaction.

The molar ratio of steroid to oxidizing agent is theoretically one to one although more oxidizing agent may be used if over-oxidation and/or halogenation is avoided by employing a low reaction temperature, precipitation of the cortisone ester from the mixture, decomposition of the excess oxidizing agent after the theoretical molar equivalent has been consumed, or by other techniques known in the art. Since moisture in the reaction mixture promotes halogenation and other side-reactions, the oxidation is preferably conducted in the absence of any significant amounts of water.

The order of mixture of reagents is not critical although the steroid and amine are preferably dissolved in the solvent prior to the addition of the oxidizing agent. The time required for complete reaction varies considerably, depending in part upon the oxidizing agent selected and the reaction temperature. Titration from time to time of the oxidizing agent remaining in aliquot portions of the reaction mixture serves as a check of the progress of the oxidation.

The following examples are illustrative of the process of the present invention but are not to be construed as limiting.

*Example 1.—17α-hydroxy-21-acetoxy-4-pregnene-3,11,20-trione*

To a solution of 1.01 grams (2.5 millimoles) of 11β,17α-dihydroxy-21-acetoxy-4-pregnene-3,20-dione and two milliliters of pyridine in 75 milliliters of tertiary butyl alcohol was added 500 milligrams of N-bromo-acetamide. The reaction was maintained at room temperature for about sixteen hours during which time long crystals of product precipitated from the solution. The solution was diluted with fifty milliliters of water containing 500 milligrams of sodium sulfite and the whole was then concentrated at reduced pressure to about forty milliliters. The distillation residue was refrigerated, filtered and the filter cake was washed with water and then dried. The dried filter cake consisted of 930 milligrams (a yield of 92.5 percent of the theoretical) of 17α-hydroxy-21-acetoxy-4-pregnene-3,11,20-trione melting at 230 to 241 degrees centigrade.

In exactly the same manner, other esters of hydrocortisone are oxidized to the corresponding esters of cortisone. 11β,17α-dihydroxy-21-acyloxy-4-pregnene-3,20-diones thus-oxidized include those wherein the acyloxy group is formyloxy, propionyloxy, butyryloxy, isobutyryloxy, trimethylacetoxy, valeryloxy, hexanoyloxy, cyclopentanepropionyloxy, benzoxy, naphthoyloxy, succinoyloxy, heptanoyloxy, actanoyloxy, phenylacetoxy, 2,6-dimethylbenzoxy, and others.

*Example 2.—17α-hydroxy-21-acetoxy-4-pregnene-3,11,20-trione*

Following the procedure of Example 1 exactly but substituting a molar equivalent of N-bromo-succinimide for the N-bromo-acetamide used therein, hydrocortisone acetate is oxidized to cortisone acetate.

*Example 3.—17α-hydroxy-21-acetoxy-4-pregnene 3,11,20-trione*

Following the procedure of Example 1 exactly but substituting a molar equivalent of N-chloro-succinimide for the N-bromo-acetamide used therein, hydrocortisone acetate is oxidized to cortisone acetate.

*Example 4.—17α-hydroxy-21-acetoxy-4-pregnene-3,11,20-trione*

Following the procedure of Example 1 exactly but substituting a molar equivalent of N-chloro-acetamide for the N-bromo-acetamide used therein, hydrocortisone acetate is oxidized to cortisone acetate.

It is to be understood that this invention is not to be limited to the exact details of operation or exact compounds shown and described as obvious modifications and equivalents will be apparent to one skilled in the art and the invention is therefore to be limited only by the scope of the appended claims.

I claim:

1. A process for the production of 17α-hydroxy-21-acyloxy-4-pregnene-3,11,20-trione which comprises oxidizing 11β,17α-dihydroxy-21-acyloxy-4-pregnene-3,20-dione wherein the acyl radical is that of a hydrocarbon carboxylic acid containing from one to eight carbon atoms, inclusive, with a compound selected from the group consisting of N-chloro-carboxylic acid amides, N-chloro-carboxylic acid imides, N-bromo-carboxylic acid amides and N-bromo-carboxylic acid imides, in a substantially non-reactive organic solvent containing at least about a molar equivalent, calculated on the starting steroid, of an amine, to produce 17α-hydroxy-21-acyloxy-4-pregnene-3,11,20-trione.

2. A process for the production of 17α-hydroxy-21-acyloxy-4-pregnene-3,11,20-trione which comprises oxidizing 11β,17α-dihydroxy-21-acyloxy-4-pregnene-3,20-dione wherein the acyl radical is that of a hydrocarbon carboxylic acid containing from one to eight carbon atoms, inclusive, with N-bromo-acetamide in a substantially non-reactive organic solvent containing at least about a molar equivalent, calculated on the starting steroid, of a heterocyclic aromatic tertiary amine, at a temperature between about zero and about fifty degrees centigrade, to produce 17α-hydroxy-21-acyloxy-4-pregnene-3,11,20-trione.

3. The process of claim 2 wherein the amine is selected from the group consisting of pyridine and alkyl substituted pyridines.

4. A process for the production of 17α-hydroxy-21-acetoxy-4-pregnene-3,11,20-trione which comprises oxidizing 11β,17α-dihydroxy-21-acetoxy-4-pregnene-3,20-dione at about room temperature with N-bromo-acetamide in tertiary butyl alcohol containing at least about a molar equivalent, calculated on the starting steriod, of pyridine to produce 17α-hydroxy-21-acetoxy-4-pregnene-3,11,20-trione.

5. A process for the production of 17α-hydroxy-21-acetoxy-4-pregnene-3,11,20-trione which comprises oxidizing 11β,17α-dihydroxy-21-acyloxy-4-pregnene-3,20-dione with N-bromo-succinimide in a substantially non-reactive organic solvent containing at least about a molar equivalent, calculated on the starting steroid, of a heterocyclic aromatic tertiary amine, at a temperature between about zero and about fifty degrees centigrade, to produce 17α-hydroxy-21-acetoxy-4-pregnene-3,11,20-trione.

6. The process of claim 2 wherein the amine is selected from the group consisting of pyridine and alkyl substituted pyridines.

7. A process for the production of 17α-hydroxy-21-acetoxy-4-pregnene-3,11,20-trione which comprises oxidizing 11β,17α-dihydroxy-21-acetoxy-4-pregnene-3,20-dione at about room temperature with N-bromo-succinimide in tertiary butyl alcohol containing at least about a molar equivalent, calculated on the starting steriod, of pyridine to produce 17α-hydroxy-21-acetoxy-4-pregnene-3,11,20-trione.

References Cited in the file of this patent

UNITED STATES PATENTS 2,672,467    Hanze _____ Mar. 16, 1954